(No Model.)

G. H. JENKINS & S. A. HYERS.
COPYING BATH.

No. 418,288. Patented Dec. 31, 1889.

Witnesses:
Albert H. Adams.
Harry T. Jones.

Inventors
George H. Jenkins
Samuel A. Hyers

UNITED STATES PATENT OFFICE.

GEORGE H. JENKINS AND SAMUEL A. HYERS, OF CHICAGO, ILLINOIS, ASSIGNORS TO THE SHEA SMITH & COMPANY, OF SAME PLACE.

COPYING-BATH.

SPECIFICATION forming part of Letters Patent No. 418,288, dated December 31, 1889.

Application filed July 29, 1889. Serial No. 319,120. (No model.)

*To all whom it may concern:*

Be it known that we, GEORGE H. JENKINS and SAMUEL A. HYERS, residing at Chicago, in the county of Cook and State of Illinois, and citizens of the United States, have invented a new and useful Improvement in Copying-Baths, of which the following is a specification, reference being had to the accompanying drawings, in which—

Figure 1:
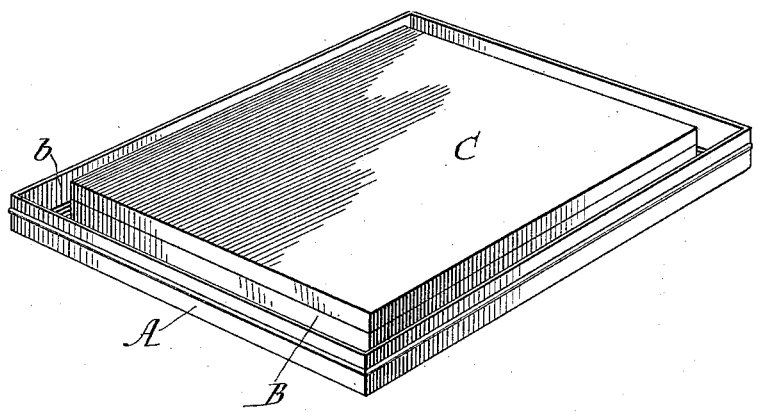
Figure 2:
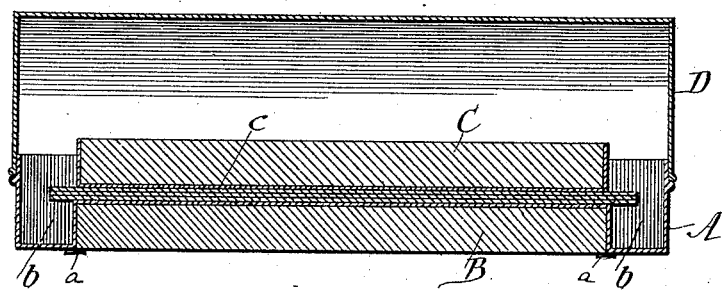
Figure 3:
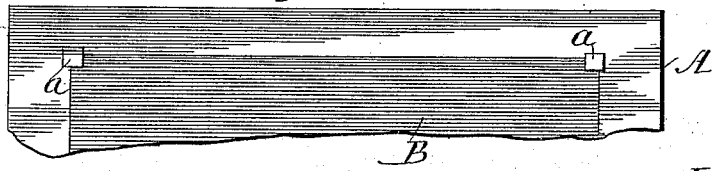

Figure 1 is a perspective view of our device with the cover removed. Fig. 2 is a longitudinal vertical section through the device, showing also therein several copying-pads. Fig. 3 is a bottom view, part of the device being broken away.

This invention relates to receptacles for holding dampened cloths or blotters which are used in letter-press copying, and has for its object to so construct such a receptacle that after the cloths or blotters have been wet and placed therein the receptacle, without its cover, can be placed in a press and the superfluous water squeezed from such cloths or blotters, the water escaping into the receptacle, which we accomplish as illustrated in the drawings and hereinafter described.

That which we claim as new will be set forth in the claim.

In the drawings, A represents a pan of galvanized iron or other suitable material, which, as shown, is oblong in shape, and the central portion of the bottom is elevated, leaving a space into which a block B, of wood or other suitable material, is placed. The block B is, as shown, held in place by small pieces of metal $a$, soldered to the bottom of the pan A; but it can be secured in any other suitable manner.

$b$ is a space between the sides and ends of the pan A and the raised central portion of its bottom.

C is a block, of wood or other suitable material, of the same size as the block B. If of wood, it should be covered with galvanized sheet-iron, or its sides and one of its faces should be so covered.

D is a removable cover.

$c$ represents several copying-cloths or blotting-pads.

When copying cloths or blotters are to be prepared for use with the aid of our improved device, the cover D and block C are to be removed, and the cloths or blotters, after being wet in the usual manner, are to be laid on the raised portion of the bottom of the pan A. The block C is then to be placed on top of the wet cloths or blotters, as shown in Fig. 2. To squeeze out the superfluous water in the cloths or blotters, the pan A, with the cloths or blotters, and the block C are to be placed in an ordinary letter-copying press and the platen screwed down. As the upper surface of the block C is above the edge of the wall of the pan, such block will receive the pressure and be pressed tightly against the cloths or blotters, squeezing the superfluous water therefrom into the space $b$ of the pan. The block B, fitting closely under the raised portion of the bottom of the pan A, and being flush with the remaining portion of such bottom, will, when the device is in the press, rest upon the bed of the press and prevent the raised portion of the bottom from being broken down. After the cloths or blotters have been squeezed, as described, and the pan has been removed from the press, the block C is to be taken off, and the cloths or blotters can then be used in the usual manner for copying. During the time that the cloths or blotters are not in use for copying they can be returned to the pan A and the block C be placed on top of them, as shown in Fig. 2, and the cover D placed on the box A, as shown. When the cloths or blotters are kept in this manner, they will be kept smooth and free from dust and will retain moisture much longer than when left uncovered. There will usually be some water in the space $b$, which will keep the air in the closed receptacle damp, and this will aid in keeping the cloths or blotters from drying for a considerable length of time.

What we claim as new, and desire to secure by Letters Patent, is—

A copying-bath consisting of a pan provided with a raised center and a water-space $b$ around such center, in combination with the block B under such raised center and forming a support therefor, and the removable block C, substantially as and for the purpose described.

GEORGE H. JENKINS.
SAMUEL A. HYERS.

Witnesses:
ALBERT H. ADAMS,
HARRY T. JONES.